United States Patent Office 3,168,547
Patented Feb. 2, 1965

3,168,547
METHOD OF SULFATING ALCOHOLS
Albin F. Turbak, New Providence, N.J., assignor to Esso Research and Engineering Company, a corporation of Delaware
No Drawing. Filed Apr. 1, 1959, Ser. No. 803,354
3 Claims. (Cl. 260—459)

The present invention relates to a method of sulfating organic compounds containing active hydrogen atoms. More particularly, it concerns the sulfation of organic compounds with the combination of a sulfur trioxide-containing substance and a polyvalent phosphorus compound.

The common sulfating agents are difficult to use because of their high reactivity with organic compounds containing active hydrogen atoms. Thus, the conditions must be stringently controlled in order to avoid charring and by-product formation during the sulfation. It has now been discovered that organic compounds can be sulfated even at temperatures substantially above 0° C. by combining a substance containing available sulfur trioxide with a trivalent or pentavalent phosphorus compound in an approximately 1:1 to 3:1 mole ratio. The complex which is formed by the reaction between the available sulfur trioxide and phosphorus compound will sulfate primary, secondary, cyclic and aromatic amines as well as primary, secondary and tertiary alcohols and phenols containing from 1 to 35 carbon atoms, as well as any other substances containing an active hydrogen atom, such as amides, enols, oximes, hydrazones and semicarbazones. Of course, where the substance to be sulfated is a polymer such as polyvinyl alcohol, cellulose or other carbohydrate, or protein, the number of carbon atoms in each molecule may exceed 35. Thus, while most of the organic compounds sulfated according to the present invention contain from 1 to 35 carbon atoms, the invention is not restricted to the sufation of these substances but rather is directed to the sulfation of any substance capable of reacting with sulfating agents.

In carrying out the present invention about 1 to 3 moles of available sulfur trioxide is contacted with 1 mole of a trivalent or pentavalent phosphorus compound in the presence or absence of an organic solvent at a temperature of —20 to 100° C. to form a complex which is a highly effective sulfating agent. The preferred mole ratio is about 1 to 2 because in this ratio range substantially all of the sulfur trioxide is firmly complexed with the electron pair or phosphoryl oxygen of the phosphorus compound. It is generally beneficial to have a substantial amount of an inert solvent present when the available sulfur trioxide is contacted with the phosphorus compound to assist in the dissipation of heat evolved from the exothermic reaction. Various solvents may be used including such things as carbon tetrachloride, chloroform, sulfur dioxide, carbon bisulfide, sym-tetrachloroethane and ethylene dichloride. Broadly speaking, any inert solvent that will dissolve the complexed $SO_3$ and the organic "active hydrogen" compound is a suitable solvent. The reactants may be contacted with each other at a temperature of —20 to 100° C. at pressures ranging up to 20 atmospheres or more for from 1 second to 1 hour. While the aforementioned conditions are suitable for the preparation of the complex, the reaction is most favorably carried out at a temperature of 10° to 50° C. under atmospheric pressure. When the reactants are admixed with adequate agitation, such as that obtained with an efficient stirrer, the reaction is almost instantaneous and therefore the time is principally dependent upon the rate of addition of the sulfur trioxide substance to the phosphorus compound. Because the reaction is accompanied by a rise in temperature in the reaction zone, it may be desirable in some instances to employ either an internal cooling system, e.g. recycling, or an external cooler in a jacket. The amount of solvent employed to facilitate the reaction and assist in the dissipation of heat will depend to a large extent on the reaction temperature. For instance at low temperatures the inert organic solvent may contain up to 95 wt. percent of reactants while at temperatures exceeding 30° C. the solvent may contain as little as 0.1 or 0.5 wt. percent, but not more than 30 wt. percent reactants. It is preferred to use a low boiling solvent which can be easily distilled from the reaction product at a temperature below 45° C. under reduced pressure, e.g. 5 to 20 mm. of mercury absolute pressure.

The sulfating complex prepared in accordance with the method described above is contacted with an organic compound having an active hydrogen, e.g. a $C_1$ to $C_{18}$ primary alcohol or amine, at a temperature of —20 to 100° C., preferably 10 to 50° C., under atmospheric or superatmospheric pressure for 1 second to 30 minutes or more. The mole ratio of complex to organic compound should be approximately 1, it generally being desirable to use a slight excess of the complex to insure complete sulfation, e.g. up to 20% excess. The sulfation is most advantageously carried out in the presence of an inert organic solvent which is capable of dissolving both of the reactants but will not interfere with the sulfating reaction. Suitable solvents include chloroform, carbon tetrachloride, sulfur trioxide, carbon bisulfide, sym-tetrachloroethane, ethylene dichloride, benzene, and hexane. The sulfating complex may be dissolved in an inert organic solvent, e.g. 0.5 to 95 wt. percent solution, prior to admixing it with the organic compound dissolved in the same or a different but compatible solvent. While the organic compound solution may contain as little as 1 wt. percent of organic compound, solutions containing as much as 95 wt. percent may also be used. However, the concentration of organic compound in the solvent will depend to a large extent on its solubility, and in some instances it may be desirable not to use a solvent. Since the sulfating reaction is exothermic a cooling jacket or recycle means should be employed especially where little or no solvent is present in the reaction zone to dissipate the heat of reaction. The solvent may be flashed off at a temperature up to 150° C. and preferably under reduced pressure, e.g. 10 to 50 mm. of mercury absolute pressure. The acid produced by the sulfation may be neutralized with sodium hydroxide, e.g. 40 wt. percent solution, and the sodium salt thus produced may be dried either by heating it or mixing it with a dehydrating agent, such as anhydrous sodium sulfate. Any excess caustic and salts may be removed by extracting the reaction product with an alcohol, such as isopropanol. The phosphorus compounds in the product may be removed by extracting the product with a selective solvent. The phosphorus compounds may be recovered from the solvent by evaporation. The sulfated organic substance, either in the crude or purified form may be employed as a detergent, water thickener or ion exchange resin. Suitable ion exchange resins may be prepared by partially sulfating cellulose so as to introduce exchangeable ions and yet not make it water soluble.

While the phosphorus compound may be either inorganic or organic, it is preferred to use an organic phosphorus compound containing either of the following functional groups:

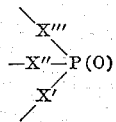

or

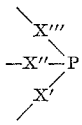

in which X′, X″ and X‴ are either oxygen or carbon and need not be the same; O is oxygen and P is phosphorus. Various organic phosphite, phosphinite, phosphinate, phosphate, phosphonate, phosphonite, pyrophosphate, and metaphosphate compounds may be employed to prepare the complexed product. The compounds may contain from 0 to 3 ester oxygens which may have alkyl, aryl, alkaryl or aralkyl groups attached to them containing 1 to 18 carbon atoms. Similar organic groups may be attached to the phosphorus directly as indicated above when "X" is carbon. These organic groups should be relatively nonreactive, especially with the available sulfur trioxide used to form the complex. If a reaction does occur between the sulfur trioxide and the organic group attached to the phosphorus, it will be necessary to use additional sulfur trioxide to compensate for this loss. Complexes containing inorganic acids such as phosphoric acid, phosphorous acid, pyrophosphoric acid, metaphosphoric acid, phosphonic acid and phosphinic acid are suitable as sulfating agents. In addition to the acids their mono-, di- and tri-substituted derivatives may also be employed. However, the preferred phosphorus compounds are the trialkyl phosphates, pyrophosphates and phosphites.

Among the organic phosphorus compounds which may be employed to produce the complexes of the present invention are the following; triethyl phosphate, trimethyl phosphate, tripropyl phosphite, tri-butyl phosphate, triethyl phosphite, trimethyl phosphite, tripropyl phosphite, tri-butyl phosphite, diethyl hydrogen phosphate, dimethyl hydrogen phosphate, diethyl hydrogen phosphite, dimethyl hydrogen phosphite, ethyl dihydrogen phosphate, methyl dihydrogen phosphate, ethyl dihydrogen phosphite, methyl dihydrogen phosphite, tris (2,4-dichlorophenyl) phosphate, tris (2,4-dichlorophenyl) phosphite, bis (2,4-dichlorophenyl) hydrogen phosphate, bis (2,4-dichlorophenyl hydrogen phosphite, tris (p-nitrophenyl) phosphate, tris (p-nitrophenyl) phosphite, bis (p-nitrophenyl) hydrogen phosphate, bis (p-nitrophenyl) hydrogen phosphite, tris (p-sulfophenyl) phosphate, tris (p-sulfophenyl) phosphite, 2,4-dichlorophenyl dihydrogen phosphate, 2,4-dichlorophenyl dihydrogen phosphite, tetraethyl pyrophosphate, tetramethyl pyrophosphate, dimethyl diethyl pyrophosphate, ethyl metaphosphate, bis (2,4-dichlorophenyl) diethyl pyrophosphate, sym-p-nitrophenyl pyrophosphate, p-nitrophenyl metaphosphate, tris (B-chloroethyl) phosphate, tetra (B-chloroethyl) pyrophosphate, diethyl dihydrogen pyrophosphate, di (2,4-dichlorophenyl) dihydrogen pyrophosphate, tris (2,4,6-trimethylphenyl) phosphate and tris (3,4,6-trimethylbenzyl) phosphate.

By the term "available sulfur trioxide" is meant not only sulfur trioxide itself but also those substances which contain sulfur trioxide in a loosely bound form from which it can be readily liberated when treated with the phosphorus compound. Fuming sulphuric acid ("oleum," 20–80%) and chlorosulphonic acid are examples of products of the latter type which will form compounds with the phosphorus compound similar to that formed by sulfur trioxide but differing from that formed by ordinary sulphuric acid, and which act like sulfur trioxide-phosphorus complexes in sulfation reactions. For the purposes of the present invention, compounds containing sulfur trioxide in loosely bound form may be considered equivalents of sulfur trioxide although the products may differ in some respect.

The organic compounds which may be sulfated in accordance with the present invention contain 1 or more active hydrogen atoms or sites, that is to say, they may have 1 or several alcohol, amine, amide, oxime, hydrazone or enol functions. Among the substances which may be sulfated with the complex are primary, secondary and tertiary monohydric alcohols, such as ethyl alcohol, methyl alcohol, isobutyl alcohol, phenol, resorcinol, secondary butyl alcohol, normal octyl alcohol, ethylene oxide adducts with a pendant hydroxyl end group, lauryl alcohol, t-butyl alcohol, methylols, furfuryl alcohol and benzyl alcohol; polyhydric alcohols such as glycol, glycerine, polyvinyl alcohol, cellulose, starches, alginates, and sugars, e.g. glucose; primary and secondary amines, such as methyl amine, dimethyl amine, aniline, n-methylaniline, benzidine, ethyl amine, normal butyl amine, ethylene diamine, ethyl glycinate, lauryl amine, cyclic amines such as pyrrole, 1,2,3-benzotriazole, polyamines, such as those found in proteins, imides and amides such as acetamide, benzene sulfonamide, phthalimide, succinimide, lauramide, urea and polyacrylamide; enols such as the enolic form of ethylacetoacetate, reductase, ascorbic acid, dihydropyrogallol and acetone-dicarboxylic acid; oximes such as dimethyl glyoxime, n-heptaldoxime, and acetoxime, and hydrazones such as phenyl hydrazone and benzophenone hydrazone.

The mole ratio of available sulfur trioxide in the complex to the organic compound to be sulfated will vary according to the number of active sites the organic compound contains. For instance optimum results are obtained when a mole ratio of approximately 1 is used in the sulfation of a monohydric alcohol. Where the organic compound contains 2 or 3 active sites, such as glycol and glycerol, it is necessary to use 2 or 3 moles of available sulfur trioxide per mole of organic compound in order to obtain substantially complete sulfation. More than 1 mole of available sulfur trioxide may be used per active site in each mole of organic substance in order to drive the reaction to completion, e.g. up to 15 to 20 mole percent excess reagent can be used. Charring and side reactions will not readily occur due to excess complex reagent unless the ratio of $SO_3$ to phosphorus substantially exceeds 1. The use of $SO_3$/phosphate of 2 or 3 ratios tends to produce color bodies and side reactions. However, in the case of pyrophosphates, a 2/1 ratio of $SO_3$/phosphate will not cause charring because the phosphorus compounds contain 2 phosphoryl oxygen sites. Complexing the $SO_3$ with the ester oxygens, e.g. alkoxy oxygens, by use of excess $SO_3$ results in a far more active specie than that obtained when $SO_3$ is complexed with the phosphoryl oxygen or to the free electron pair.

The following examples are given to more fully illustrate how the present invention may be carried out.

*Example 1*

To 36.6 grams (0.2 mole) of triethyl phosphate dissolved in 250 cc. of dichloroethane at 25° C. was added 8.32 cc. (0.2 mole) of sulfur trioxide with stirring. It was noted that when the reactants were contacted the temperature rose from 25° C. to 45° C. To the complex formed by the reaction of sulfur trioxide with triethyl phosphate was added 37.2 grams of lauryl alcohol dissolved in 50 cc. of dichloroethane. It was noted that a considerable amount of heat evolved as the alcohol was added to the complex with stirring and the addition of the alcohol was adjusted so as to keep the temperature of the reaction mixture at approximately 35° C. After stirring for 15 minutes the reaction mixture was heated on a steam bath to reduce the volume of liquid to 75 cc. The liquid was then diluted with 400 cc. of methyl alcohol and a solid precipitated from the mixture when a 50 wt. percent solution of sodium hydroxide was added to the mixture to neutralize the acid product. The solid was then filtered from the liquid and dried in a vacuum oven overnight at 60° C. under 25 mm. of mercury absolute pressure. The dried product was a white waxy solid which contained 11.5% combined sulfur. Theoretically, the amount of sulfur which would be in the sodium salt of sulfated lauryl alcohol is 11.1%. The product was soluble in water and produced a foam when shaken in aqueous solution.

*Example 2*

To 18.3 grams (1/10 mole) of triethyl phosphate dissolved in 100 cc. of dichloroethane at 25° C. was added 4.16 cc. (0.1 mole) of sulfur trioxide with stirring. The temperature of the reaction mixture rose as indicated in Example 1. To the sulfur trioxide triethyl phosphate formed was added 24.2 grams (0.1 mole) of a $C_{16}$ aliphatic primary alcohol, obtained from the so-called "Aldox" process, which had the following structure:

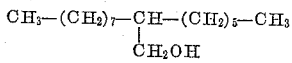

The alcohol which was dissolved in 50 cc. of dichloroethane was added over a 5 minute period with external cooling to keep the temperature at 25° C. After the alcohol was added to the complex and the mixture was thoroughly stirred, a light yellow liquid was obtained. The liquid was allowed to stand at room temperature for about 15 minutes and thereafter it was poured over 50 grams of ice in a 1 liter beaker and neutralized with 40 wt. percent sodium hydroxide. The dichloroethane solvent was evaporated from the neutralized product on a steam bath while a stream of nitrogen was bubbled through the liquid. 300 cc. of isopropyl alcohol was added to the stripped product and sufficient water was then added to bring the total volume to 600 cc. The mixture was then warmed to 40 to 60° C. and dehydrated by adding an excess of sodium sulfate to the liquid. The liquid mixture was then permitted to stand until two distinct layers appeared. The upper alcohol layer was siphoned off and to it was added sufficient water to bring the total volume to 600 cc. The mixture was then extracted three times with petroleum ether, the ether extracts were evaporated and 6 grams of residue were recovered. The extracted alcohol-water mixture was made slightly acidic with sulfuric acid, warmed to 40 to 60° C. and mixed with an excess of anhydrous sodium carbonate. Upon cooling two separate layers appeared, the upper alcohol layer of which was siphoned off. Additional alcohol was added to the alcohol layer to bring the concentration of alcohol to 87 vol. percent. The liquid was then cooled and a slight excess of anhydrous sodium carbonate was added to the alcoholic solution. The solution was filtered and the filtrate was evaporated on a steam bath until a thick syrupy substance was obtained. This was dried in a vacuum desiccator at a pressure which was less than 1 mm. of mercury absolute pressure at 40 to 50° C. for 18 hours. A clear viscous gel-like solid was obtained which contained 7.35% combined sulfur and 2.38% phosphorus. After solvent extraction the product contained 8.5% sulfur and 1% phosphorus.

*Example 3*

Example 2 was repeated except the complex was prepared with 0.115 mole of sulfur trioxide and 0.115 mole of triethyl phosphate, and the sulfation reaction was carried out at 45° C. The reaction product had the same light yellow color observed in the previous example and it appeared that the higher temperature and excess reagent did not appreciably promote side reactions which produce color bodies. The product was purified as described in the previous example and found to contain approximately the same amount of combined sulfur.

This example demonstrates one of the advantages of the present invention, which is that the sulfation reaction may be carried out at higher temperatures without adversely affecting the reaction product. Conventional sulfating procedures cannot be carried out at such high temperatures because of the excessive amount of charring and side reactions which occur.

*Example 4*

Example 1 was repeated except that only 0.033 mole of triethyl phosphate was used to prepare the complex ($SO_3$/phosphorus ratio of 3) and the sulfation reaction was carried out at 35° C. Under these conditions the reaction product recovered was dark brown in color which indicated that side reactions took place during the sulfation. This example shows that while up to 3 moles of available sulfur trioxide may be used per mole of phosphorus compound to prepare a sulfating complex, it is advisable to use a mole ratio of approximately 1 (except where a pyrophosphate is used) where it is desirable to avoid the formation of color bodies.

*Example 5*

Example 1 is repeated except that 0.2 mole of tetrabutyl pyrophosphate is reacted with 0.4 mole of sulfur trioxide and the complex formed is used to sulfate lauryl alcohol.

*Example 6*

Example 1 is repeated except that 0.2 mole of dipropyl hydrogen phosphate is reacted with 0.2 mole of chlorosulfonic acid and the complex formed is used to sulfate lauryl alcohol.

*Example 7*

Example 1 is repeated except that 0.2 mole of dimethylphosphite is reacted with 0.2 mole of sulfur trioxide and the complex formed is used to sulfate lauryl alcohol.

Resort may be had to various modifications and variations of the present invention without departing from the spirit of the discovery or the scope of the appended claims.

What is claimed is:

1. The method which comprises reacting an organic compound selected from the group consisting of alcohols and phenols containing from 1 to 35 carbon atoms per molecule with a composition of matter consisting essentially of a combination of sulfur trioxide derived from a member of the group consisting of sulfur trioxide, chlorosulfonic acid and oleum with a trialkyl phosphate wherein each alkyl group contains 1 to 18 carbon atoms, said composition constituting a sulfur trioxide-trialkyl phosphate complex containing from one to three moles of sulfur trioxide per mole of trialkyl phosphate, at temperatures of from —20 to 100° C. to form the sulfuric ester of the said organic compound without appreciable charring thereof and recovering the sulfuric ester product from the reaction mixture.

2. Method for preparing sulfuric esters of primary alcohols comprising reacting a $C_1$ to $C_{18}$ primary alcohol with a complex comprising about 1 to 2 moles of sulfur trioxide per mole of a trialkyl phosphate in which each alkyl group contains 1 to 18 carbon atoms at temperatures between about —20 and about 100° C., the mole ratio of sulfur trioxide in said complex to said alcohol being approximately one, and recovering the sulfuric ester product from the reaction mixture.

3. Method for preparing sulfuric esters of primary alcohols comprising reacting a $C_1$ to $C_{18}$ primary alcohol with a complex comprising about 1 mole of sulfur trioxide per mole of triethyl phosphate at temperatures between about 10° and 50° C. under substantially atmospheric pressure, the mole ratio of the sulfur trioxide in said complex to the alcohol being approximately one, and recovering the sulfuric ester product from the reaction mixture.

References Cited in the file of this patent

UNITED STATES PATENTS 1,948,299    Jahrstorfer et al. _____ Feb. 20, 1934
2,227,659    Luther et al. _____ Jan. 7, 1941

OTHER REFERENCES

Conant et al.: "The Chemistry of Organic Compounds," The MacMillan Company, New York, 4th edition, 1952, page 104.

Berkman et al.: "Catalysis," Reinhold Publishing Corp., New York, 1940, page 702.